United States Patent
Widger et al.

(10) Patent No.: US 10,983,410 B2
(45) Date of Patent: Apr. 20, 2021

(54) ELECTRO-OPTIC MEDIA INCLUDING ENCAPSULATED PIGMENTS IN GELATIN BINDER

(71) Applicant: E INK CORPORATION, Billerica, MA (US)

(72) Inventors: Peter Carsten Bailey Widger, Nashua, NH (US); Jay William Anseth, Canton, MA (US); Richard J. Paolini, Jr., Framingham, MA (US); Craig Alan Breen, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/008,230

(22) Filed: Jun. 14, 2018

(65) Prior Publication Data

US 2018/0366069 A1    Dec. 20, 2018

Related U.S. Application Data

(60) Provisional application No. 62/520,731, filed on Jun. 16, 2017.

(51) Int. Cl.
   *G09G 3/34*      (2006.01)
   *G02F 1/167*    (2019.01)
   (Continued)

(52) U.S. Cl.
   CPC .......... *G02F 1/167* (2013.01); *G02F 1/16756* (2019.01); *G02F 1/16757* (2019.01); *G09G 3/344* (2013.01); *G02F 2202/02* (2013.01); *G02F 2202/022* (2013.01); *G02F 2202/28* (2013.01); *G09G 2320/0233* (2013.01); *G09G 2330/021* (2013.01)

(58) Field of Classification Search
   CPC .......... G09G 3/344; G09G 2320/0233; G09G 2330/021; G02F 1/167; G02F 2202/022; G02F 2202/28; G02B 26/00
   See application file for complete search history.

(56) References Cited

U.S. PATENT DOCUMENTS 4,418,346 A    11/1983   Batchelder
5,115,346 A     5/1992   Lynam
(Continued)

FOREIGN PATENT DOCUMENTS

CN    103834285 A    6/2014
JP    2003222913 A   8/2003
(Continued)

OTHER PUBLICATIONS

D. W. Wang & X. P. Zhao, Microencapsulated electric ink using gelatin/gum arabic, Journal of Microencapsulation, Feb. 2009; 26(1): 37-45 (Year: 2009).*

(Continued)

*Primary Examiner* — Bijan Ahvazi
(74) *Attorney, Agent, or Firm* — Brian D. Bean

(57) ABSTRACT

An electro-optic medium exhibiting reduced haze and having other improved properties may be obtained by including a binder containing fish gelatin and acacia. The electro-optic medium may include a plurality of capsules in a binder, each capsule containing a plurality of electrically charged particles and a fluid, the charged particles being movable by application of an electric field.

5 Claims, 3 Drawing Sheets

(51) Int. Cl.
    *G02F 1/16756*     (2019.01)
    *G02F 1/16757*     (2019.01)

(56)              References Cited

U.S. PATENT DOCUMENTS

| | | | |
|---|---|---|---|
| 5,784,136 A | 7/1998 | Ando et al. |
| 5,872,552 A | 2/1999 | Gordon, II |
| 5,930,026 A | 7/1999 | Jacobson |
| 5,961,804 A | 10/1999 | Jacobson |
| 6,017,584 A | 1/2000 | Albert |
| 6,067,185 A | 5/2000 | Albert |
| 6,120,588 A | 9/2000 | Jacobson |
| 6,120,839 A | 9/2000 | Comiskey |
| 6,130,774 A | 10/2000 | Albert |
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,249,271 B1 | 6/2001 | Albert |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,323,989 B1 | 11/2001 | Jacobson |
| 6,327,072 B1 | 12/2001 | Comiskey |
| 6,377,387 B1 | 4/2002 | Duthaler |
| 6,392,785 B1 | 5/2002 | Albert |
| 6,392,786 B1 | 5/2002 | Albert |
| 6,459,418 B1 | 10/2002 | Comiskey |
| 6,515,649 B1 | 2/2003 | Albert |
| 6,538,801 B2 | 3/2003 | Jacobson |
| 6,580,545 B2 | 6/2003 | Morrison |
| 6,623,662 B2 | 9/2003 | Wang et al. |
| 6,652,075 B2 | 11/2003 | Jacobson |
| 6,693,620 B1 | 2/2004 | Herb |
| 6,721,083 B2 | 4/2004 | Jacobson |
| 6,727,881 B1 | 4/2004 | Albert |
| 6,822,782 B2 | 11/2004 | Honeyman |
| 6,831,771 B2 | 12/2004 | Ho |
| 6,839,158 B2 | 1/2005 | Albert et al. |
| 6,866,760 B2 | 3/2005 | Paolini, Jr. |
| 6,870,661 B2 | 3/2005 | Pullen |
| 6,914,713 B2 | 7/2005 | Chung |
| 6,922,276 B2 | 7/2005 | Zhang |
| 6,927,892 B2 | 8/2005 | Ho |
| 6,950,220 B2 | 9/2005 | Abramson et al. |
| 6,956,690 B2 | 10/2005 | Yu |
| 6,958,848 B2 | 10/2005 | Cao et al. |
| 6,958,849 B2 | 10/2005 | Chen |
| 6,982,178 B2 | 1/2006 | LeCain et al. |
| 6,987,603 B2 | 1/2006 | Paolini, Jr. |
| 7,002,728 B2 | 2/2006 | Pullen |
| 7,012,600 B2 | 3/2006 | Zehner |
| 7,012,735 B2 | 3/2006 | Honeyman |
| 7,038,655 B2 | 5/2006 | Herb |
| 7,052,766 B2 | 5/2006 | Zang |
| 7,061,663 B2 | 6/2006 | Cao et al. |
| 7,071,913 B2 | 7/2006 | Albert |
| 7,072,095 B2 | 7/2006 | Liang |
| 7,075,502 B1 | 7/2006 | Drzaic |
| 7,079,305 B2 | 7/2006 | Paolini, Jr. et al. |
| 7,109,968 B2 | 9/2006 | Albert et al. |
| 7,110,162 B2 | 9/2006 | Wu |
| 7,110,164 B2 | 9/2006 | Paolini, Jr. et al. |
| 7,113,323 B2 | 9/2006 | Ho |
| 7,116,318 B2 | 10/2006 | Amundson |
| 7,116,466 B2 | 10/2006 | Whitesides et al. |
| 7,141,688 B2 | 11/2006 | Feng |
| 7,142,351 B2 | 11/2006 | Chung |
| 7,144,942 B2 | 12/2006 | Zang |
| 7,170,670 B2 | 1/2007 | Webber |
| 7,180,649 B2 | 2/2007 | Morrison |
| 7,184,197 B2 | 2/2007 | Liang |
| 7,202,991 B2 | 4/2007 | Zhang et al. |
| 7,224,511 B2 | 5/2007 | Takagi |
| 7,226,550 B2 | 6/2007 | Hou |
| 7,230,750 B2 | 6/2007 | Whitesides |
| 7,230,751 B2 | 6/2007 | Whitesides |
| 7,236,290 B1 | 6/2007 | Zhang |
| 7,236,291 B2 | 6/2007 | Kaga et al. |
| 7,242,513 B2 | 7/2007 | Albert et al. |
| 7,247,379 B2 | 7/2007 | Pullen |
| 7,256,766 B2 | 8/2007 | Albert |
| 7,277,218 B2 | 10/2007 | Hwang |
| 7,286,279 B2 | 10/2007 | Yu |
| 7,304,634 B2 | 12/2007 | Albert et al. |
| 7,312,784 B2 | 12/2007 | Baucom |
| 7,312,916 B2 | 12/2007 | Pullen |
| 7,321,459 B2 | 1/2008 | Masuda |
| 7,327,511 B2 | 2/2008 | Whitesides |
| 7,339,715 B2 | 3/2008 | Webber |
| 7,375,875 B2 | 5/2008 | Whitesides |
| 7,382,514 B2 | 6/2008 | Hsu |
| 7,387,858 B2 | 6/2008 | Chari et al. |
| 7,390,901 B2 | 6/2008 | Yang |
| 7,391,555 B2 | 6/2008 | Albert et al. |
| 7,405,865 B2 | 7/2008 | Ogiwara |
| 7,411,719 B2 | 8/2008 | Paolini, Jr. |
| 7,411,720 B2 | 8/2008 | Honeyman et al. |
| 7,420,549 B2 | 9/2008 | Jacobson |
| 7,432,907 B2 | 10/2008 | Goden |
| 7,453,445 B2 | 11/2008 | Amundson |
| 7,473,782 B2 | 1/2009 | Yang |
| 7,477,444 B2 | 1/2009 | Cao et al. |
| 7,532,388 B2 | 5/2009 | Whitesides et al. |
| 7,532,389 B2 | 5/2009 | Li |
| 7,535,624 B2 | 5/2009 | Amundson et al. |
| 7,560,004 B2 | 7/2009 | Pereira |
| 7,561,324 B2 | 7/2009 | Duthaler et al. |
| 7,572,394 B2 | 8/2009 | Gu |
| 7,576,904 B2 | 8/2009 | Chung |
| 7,580,180 B2 | 8/2009 | Ho |
| 7,679,814 B2 | 3/2010 | Paolini, Jr. |
| 7,715,088 B2 | 5/2010 | Liang |
| 7,746,544 B2 | 6/2010 | Comiskey |
| 7,767,112 B2 | 8/2010 | Hou |
| 7,839,564 B2 | 11/2010 | Whitesides et al. |
| 7,848,006 B2 | 12/2010 | Wilcox |
| 7,848,007 B2 | 12/2010 | Paolini, Jr. |
| 7,903,319 B2 | 3/2011 | Honeyman |
| 7,910,175 B2 | 3/2011 | Webber |
| 7,951,938 B2 | 5/2011 | Yang |
| 7,952,790 B2 | 5/2011 | Honeyman et al. |
| 7,955,532 B2 | 6/2011 | Liang |
| 7,999,787 B2 | 8/2011 | Amundson |
| 8,009,348 B2 | 8/2011 | Zehner |
| 8,018,640 B2 | 9/2011 | Whitesides |
| 8,035,886 B2 | 10/2011 | Jacobson |
| 8,115,729 B2 | 2/2012 | Danner |
| 8,119,802 B2 | 2/2012 | Moonen et al. |
| 8,129,655 B2 | 3/2012 | Jacobson et al. |
| 8,199,395 B2 | 6/2012 | Whitesides |
| 8,257,614 B2 | 9/2012 | Gu |
| 8,270,064 B2 | 9/2012 | Feick |
| 8,305,341 B2 | 11/2012 | Arango |
| 8,319,759 B2 | 11/2012 | Jacobson |
| 8,361,620 B2 | 1/2013 | Zang |
| 8,363,306 B2 | 1/2013 | Du |
| 8,390,918 B2 | 3/2013 | Wilcox |
| 8,446,664 B2 | 5/2013 | Chen |
| 8,582,196 B2 | 11/2013 | Walls |
| 8,593,718 B2 | 11/2013 | Comiskey |
| 8,654,436 B1 | 2/2014 | Feick |
| 8,902,491 B2 | 12/2014 | Wang |
| 8,961,831 B2 | 2/2015 | Du |
| 9,005,494 B2 | 4/2015 | Valianatos |
| 9,052,564 B2 | 6/2015 | Sprague |
| 9,114,663 B2 | 8/2015 | Ho |
| 9,158,174 B2 | 10/2015 | Walls |
| 9,279,906 B2 | 3/2016 | Kang |
| 9,341,915 B2 | 5/2016 | Yang |
| 9,348,193 B2 | 5/2016 | Hiji et al. |
| 9,361,836 B1 | 6/2016 | Telfer |

(56) References Cited

U.S. PATENT DOCUMENTS

| | | | |
|---|---|---|---|
| 9,366,935 B2 | 6/2016 | Du | |
| 9,372,380 B2 | 6/2016 | Du | |
| 9,382,427 B2 | 7/2016 | Du | |
| 9,423,666 B2 | 8/2016 | Wang | |
| 9,428,649 B2 | 8/2016 | Li | |
| 9,557,623 B2 | 1/2017 | Wang | |
| 9,645,467 B2 | 5/2017 | Yokokawa et al. | |
| 9,658,373 B2 | 5/2017 | Downing | |
| 9,664,978 B2 | 5/2017 | Arango | |
| 9,670,367 B2 | 6/2017 | Li | |
| 9,688,859 B2 | 6/2017 | Yezek | |
| 9,726,957 B2 | 8/2017 | Telfer | |
| 9,777,201 B2 | 10/2017 | Widger | |
| 9,778,537 B2 | 10/2017 | Wang | |
| 9,835,926 B2 | 12/2017 | Sprague | |
| 10,444,590 B2 | 10/2019 | Duthaler et al. | |
| 2003/0048522 A1 | 3/2003 | Liang | |
| 2003/0151029 A1 | 8/2003 | Hsu | |
| 2003/0164480 A1 | 9/2003 | Wu | |
| 2004/0012839 A1* | 1/2004 | Cao | B01J 13/10 359/296 |
| 2004/0030125 A1 | 2/2004 | Li | |
| 2005/0012980 A1 | 1/2005 | Wilcox | |
| 2005/0156340 A1 | 7/2005 | Valianatos et al. | |
| 2005/0213191 A1* | 9/2005 | Whitesides | G02F 1/167 359/296 |
| 2007/0091417 A1 | 4/2007 | Cao et al. | |
| 2007/0278448 A1* | 12/2007 | Chari | B82Y 20/00 252/299.01 |
| 2008/0130092 A1 | 6/2008 | Whitesides | |
| 2009/0009852 A1 | 1/2009 | Honeyman | |
| 2009/0122389 A1 | 5/2009 | Whitesides | |
| 2009/0206499 A1 | 8/2009 | Whitesides | |
| 2009/0225398 A1 | 9/2009 | Duthaler | |
| 2010/0148385 A1 | 6/2010 | Balko | |
| 2011/0217639 A1 | 9/2011 | Sprague | |
| 2011/0286081 A1 | 11/2011 | Jacobson | |
| 2012/0049125 A1 | 3/2012 | Du | |
| 2012/0293858 A1 | 11/2012 | Telfer | |
| 2013/0161565 A1 | 6/2013 | Laxton | |
| 2013/0193385 A1 | 8/2013 | Li | |
| 2013/0244149 A1 | 9/2013 | Wang | |
| 2014/0011913 A1 | 1/2014 | Du | |
| 2014/0078024 A1 | 3/2014 | Paolini, Jr. | |
| 2014/0078573 A1 | 3/2014 | Comiskey | |
| 2014/0078576 A1 | 3/2014 | Sprague | |
| 2014/0078857 A1 | 3/2014 | Nelson | |
| 2014/0104674 A1 | 4/2014 | Ting | |
| 2014/0231728 A1 | 8/2014 | Du | |
| 2015/0177590 A1 | 6/2015 | Laxton | |
| 2015/0185509 A1 | 7/2015 | Wang | |
| 2015/0241754 A1 | 8/2015 | Du | |
| 2015/0277205 A1 | 10/2015 | Kawahara et al. | |
| 2015/0301425 A1 | 10/2015 | Du | |
| 2016/0085132 A1 | 3/2016 | Telfer et al. | |
| 2016/0170106 A1 | 6/2016 | Wang | |
| 2016/0246154 A1 | 8/2016 | O'Keeffe | |
| 2017/0097556 A1 | 4/2017 | Wu et al. | |

FOREIGN PATENT DOCUMENTS

| | | |
|---|---|---|
| KR | 20130078094 A | 7/2013 |
| KR | 20160052092 A | 5/2016 |

OTHER PUBLICATIONS

Korean Intellectual Property Office, PCT/US2018/037508, International Search Report and Written Opinion, dated Oct. 8, 2018.

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

European Patent Office, EP Appl. No. 18818200.0, Extended European Search Report, dated Jan. 25, 2021.

\* cited by examiner

ELECTRO-OPTIC MEDIA INCLUDING ENCAPSULATED PIGMENTS IN GELATIN BINDER

CROSS-REFERENCE TO RELATED APPLICATION

This application claims the benefit of and priority to U.S. Provisional Patent Application having Ser. No. 62/520,731, filed on Jun. 16, 2018. The entire content of this application and of all other U.S. patents and published and copending applications mentioned below, are herein incorporated by reference in their entireties.

BACKGROUND OF INVENTION

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

U.S. Pat. No. 7,327,511 describes variable transmission devices including charged pigment particles that are distributed in a non-polar solvent and encapsulated. These variable transmission devices can be driven to an open state with an AC driving voltage whereby the charged pigment particles are driven to the capsule walls. Accordingly, such variable transmission devices are useful for viewing surfaces where it is desirable to alter the transmissivity at will, such as privacy glass, sunroofs, and windows on buildings.

The '511 patent describes various factors which are important in adapting electrophoretic media for optimum performance in variable transmission devices. One important factor is minimizing haze. In this application, "haze" refers to the percentage of diffuse transmitted light (light that is scattered as it is transmitted), compared to total transmitted light. When using encapsulated electro-optic media, the haze can be reduced by index-matching the binder to be as close as possible to the index of refraction of the capsules retaining the switching medium. As described in the '511 patent, it is beneficial to use polymeric binders that are not greater than 0.07 different than the refractive index of the capsules. However, as the '511 patent recognizes, attempts to closely-match the indexes of the capsules and the binder often fail because binder materials with the correct index of refraction typically have other properties, such as electrical conductivity or workability, that make the binder materials unsuitable for use in an electro-optic displays. The '511 patent reports that gelatins, poly(vinylpyrrolindone), cellulose, and poly(methylacrylamide) might be used as binder material, but all have their shortcomings. In particular, these binder materials do not lend themselves to a well-behaved slurry of coacervated capsules that can coated onto sheet and subsequently laminated. Accordingly, most electro-optic media produced for electrophoretic displays (e.g., Amazon Kindle®) rely on binders of polyurethane.

An additional shortcoming of "exotic" binder materials is so-called "kickback," or the self-erasing of an optical display state due to a mismatch in impedance (or other electrical property) between the internal phase, the microcapsule walls, and the surrounding binder, which can be characterized as a series of resistors. The impedance mismatch can allow zones of charge to build up between the various materials and influence the position of the electrophoretic particles in the internal phase, resulting in optical-state decay. Obviously, self-erasing is highly undesirable in that it reverses (or otherwise distorts, in the case of a grayscale display) the desired optical state of the display, or allows a transmissive device to fade from open to closed. It has been found that self-erasing is a particular problem in polymer-dispersed electrophoretic media and displays, where the capsule is essentially removed from the electro-optic media, leaving only bubbles of internal phase in a polymer binder.

SUMMARY OF INVENTION

Despite earlier work to the contrary, it has been discovered that certain gelatin formulations, in particular fish gelatin and acacia mixtures, are suitable as binders for encapsulated electro-optic media. Moreover, when used in conjunction with pig gelatin/acacia coacervates to encapsulate internal phases, these gelatin binders provide excellent index-matching, and thus low haze, e.g., when incorporated into transmissive devices. Additionally, electro-optic media incorporating a mixture of fish gelatin and acacia as a binder do not suffer from the kickback that is observed in gelatin-only binder compositions.

The invention, thus, relates to an electro-optic medium comprising a plurality of capsules in a binder that comprises a mixture of fish gelatin and acacia. The capsules are typically formed from a coacervate of gelatin and acacia and they encapsulate an internal phase comprising a mixture of a non-polar solvent and charged pigment particles. In some embodiments, the binder comprises a weight ratio of fish gelatin to acacia of 0.5 to 2.0 or more preferably, about equal parts by weight of fish gelatin and acacia. In some embodiments, the capsules additionally encapsulate more than one type of charged pigment particles, e.g. second, third, etc. charged pigment particles and each set of charged particles may have a color selected from a variety of colors, e.g. white, black, red, green, blue, magenta, cyan, and yellow. In one embodiment, the capsules may contain second charged pigment particles oppositely charged and a different color than the first charged pigment particles. In some embodiments, the binder additionally comprises a pigment or dye. The mixture of a non-polar solvent and first charged pigment particles may additional comprises a charge control agent, while the non-polar solvent may be a mixture of hydrocarbons or limonene, e.g., l-limonene. Binders of the invention may have an index of refraction between 1.47 and 1.57 at 550 nm.

The electro-optic media of the invention can be incorporated into a variety of electro-optic devices. For example, a front plane laminate (FPL) may include a light-transmissive electrode layer, an adhesive layer, and the electro-optic medium of the invention. In some embodiments, the front plane laminate will also include a release sheet or an adhesive layer or both. The electro-optic media of the invention can also be incorporated into an electro-optic display including a light-transmissive electrode layer, an adhesive layer, the electro-optic media of the invention, and an array of pixel electrodes. Alternatively, a variable transmission device can be fabricated by combining a first light-transmissive electrode layer, an adhesive layer, the electro-optic medium of the invention, and a second light transmissive electrode layer. In some variable transmission devices, the charged pigment particles will include carbon black.

DETAILED DESCRIPTION

The invention provides improved electro-optic media including encapsulated pigment particles. In particular, a mixture of approximately equal parts fish gelatin and acacia has been found to be an excellent binder for use with capsules formed from a coacervate of (pig) gelatin and acacia. This result is surprising because neither fish gelatin nor acacia, alone, are suitable binder materials for electro-optic media. As described below, fish gelatin, alone, has unacceptable kickback while acacia, alone, will shrink and crack when conditioned after coating. The resulting electro-optic medium has low haze when used in transmissive devices as well as less kickback, and thus greater long-term state stability. It has also been observed that color electrophoretic displays that include an electro-optic medium according to various embodiments of the invention may exhibit a wider operating temperature range. The electro-optic media can be coated over large surfaces and laminated with electrodes, etc., to create a variety of electro-optic devices, including sunlight-readable displays and smart windows.

Figure 1A:
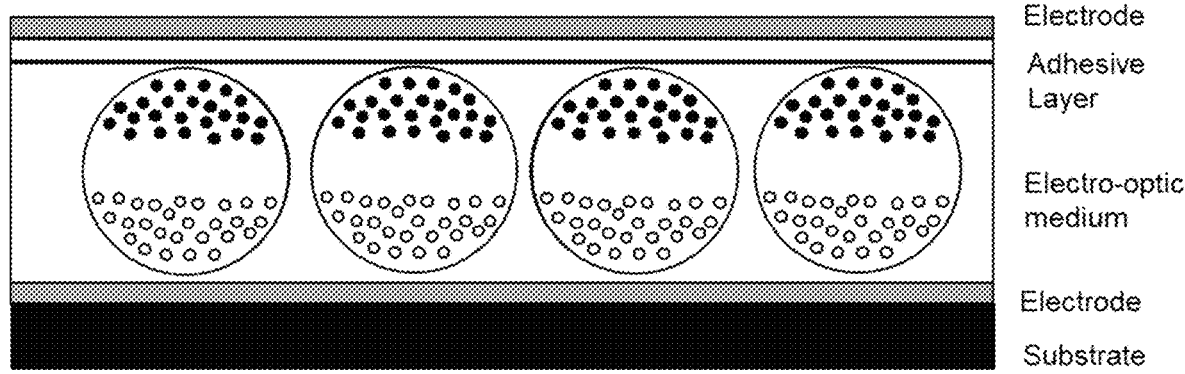
FIG. 1A is an illustration of an electro-optic display including two types of charged particles. The particles can be moved toward (away) from a viewer with the application of an electric field.

Electrophoretic displays (such as an eReader) are typically opaque and operate in a reflective mode. This functionality is illustrated in FIG. 1A, where the reflectivity of light striking a surface is modulated by moving black or white charged particles toward a viewing surface with a suitable voltage. However, electrophoretic devices can also be made to operate in a so-called "shutter mode," illustrated in FIG. 1B, wherein one operating state is substantially opaque and another operating state is light transmissive. When this "shutter mode" electrophoretic device is constructed on a transparent substrate, it is possible to regulate transmission of light through the device. One potential use for shutter mode electrophoretic media is windows with variable light transmission.

Figure 1B:
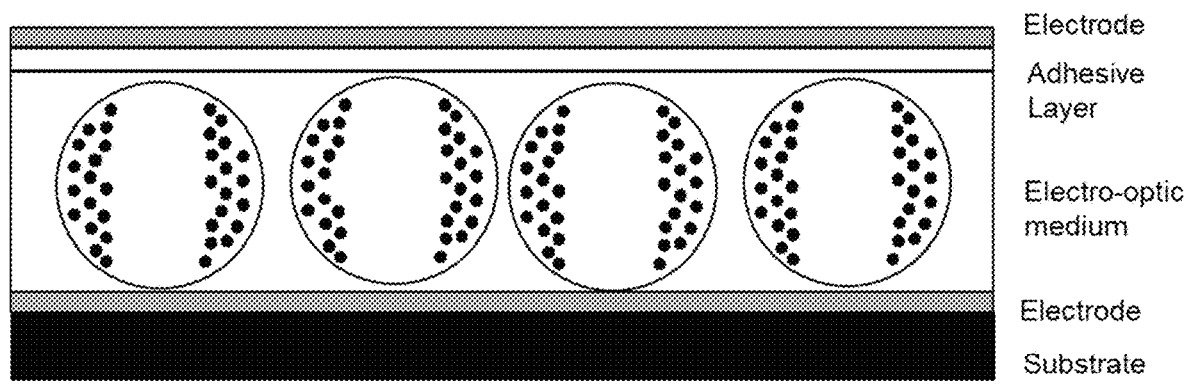
FIG. 1B is an illustration of a variable transmission device including first and second light-transmissive electrode layers with an electro-optic medium disposed between the layers. The particles can be move adjacent the capsule walls with the application of an electric field, thereby allowing light to pass through the medium.

The devices of FIGS. 1A and 1B include electro-optic media that consists of capsules in a polymeric binder. The capsules contain charged pigment particles that move in response to an electric field. The capsules are typically formed from gelatin materials described in greater detail below. The electro-optic medium is distributed between first and second electrode layers, which may be made from known materials such as indium-tin oxide (ITO) coated polyethylene terephthalate (PET). Alternatively, an electrode layer may comprise metal electrodes, which may be arranged as pixels. The pixels may be controllable as an active matrix, thereby allowing for the display of text and pictures. An additional adhesive layer is typically present between the electro-optic medium and one of the electrode layers. The adhesive layer may be UV curable, and typically improves the planarity of the final device by "filling in" deviations created by the capsules. Suitable adhesive formulations are described in U.S. 2017/0022403, which is incorporated by reference herein.

When a DC field is applied to the device of FIG. 1A, the dark or light particles move toward the viewing surface, thereby changing the optical state from dark to light. In FIG. 1B, when an alternating electric field is applied to one of the electrodes, the charged pigment particles are driven to the walls of the capsule, resulting in an aperture through the capsule for the transmission of light, i.e., an open state. In both embodiments, because the solvent is non-polar and comprises charge control agents and/or stabilizers, the optical state (black/white; open/closed) can be maintained for long periods of time (weeks) without the need to maintain the electric field. As a result, when the devices are "switched" only a couple of times a day, they consume very little power An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The term "gray state" is used herein in its conventional meaning in the imaging art to refer to a state intermediate two extreme optical states of a pixel, and does not necessarily imply a black-white transition between these two extreme states. For example, it is known to use electro-optic displays as variable transmission windows in which the extreme states are substantially transparent and essentially opaque, so that an intermediate "gray state" would be partially transmissive but may not actually be gray in color. Indeed, if the particles used are light-scattering, a partially transmissive "gray state" may actually be colored white. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Some of the materials and techniques described in the patents and applications listed below are relevant to fabricating variable transmission devices described herein, including:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

The internal phase of the electro-optic medium includes charged pigment particles in a suspending fluid. The fluids used in the variable transmission media of the present invention will typically be of low dielectric constant (preferably less than 10 and desirably less than 3). Especially preferred solvents include aliphatic hydrocarbons such as heptane, octane, and petroleum distillates such as Isopar® (Exxon Mobil) or Isane® (Total); terpenes such as limonene, e.g., l-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of index matching agents such as Cargille® index matching fluids available from Cargille-Sacher Laboratories Inc. (Cedar Grove, N.J.). In encapsulated media of the present invention, it is preferred that the refractive index of the dispersion of particles match as closely as possible that of the encapsulating material to reduce haze. This index-matching is best achieved (when employing commonly-available polymeric encapsulants) when the refractive index of the solvent is close to that of the encapsulant. In most instances, it is beneficial to have an internal phase with an index of refraction between 1.51 and 1.57 at 550 nm, preferably about 1.54 at 550 nm.

Charged pigment particles may be of a variety of colors and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, $ZnO$, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e g, manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entirety.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly (ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state. As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The gelatin-based capsule walls used in the variable transmission devices have been described in many of the E Ink and MIT patents and applications mentioned above. The gelatin is available from various commercial suppliers, such as Sigma Aldrich or Gelitia USA. It can be obtained in a variety of grades and purity depending upon the needs of the application. Gelatin primarily comprises collagen that has been collected from animal products (cow, pig, poultry, fish) and hydrolyzed. It comprises a mixture of peptides and proteins. In many of the embodiments described herein the gelatin is combined with acacia (gum arabic), which is derived from the hardened sap of the acacia tree. Acacia is a complex mixture of glycoproteins and polysaccharides, and it is often used as a stabilizer in food stuffs. Aqueous solutions of acacia and gelatin can be coacervated with a non-polar internal phase, as described below, to produce clear and flexible capsules containing internal phase.

Capsules incorporating gelatin/acacia may be prepared as follows; see, for example U.S. Pat. No. 7,170,670, incorporated by reference in its entirety. In this process, an aqueous mixture of gelatin and acacia is emulsified with a hydrocarbon internal phase (or other water-immiscible phase which it is desired to encapsulate) to encapsulate the internal phase. The mixture is raised to 40° C., and the pH of the mixture is lowered to approximately 4.9 to cause formation of the gelatin/acacia coacervate, thereby forming capsules. The temperature of the resultant mixture is then lowered to 10° C. and an aqueous solution of glutaraldehyde (an agent for cross-linking the capsule walls) is added. The resultant mixture is then warmed to 25° C. and stirred vigorously for a further 12 hours. A finishing step (holding the capsule mixture at 50° C. for about one hour) is used to deactivate remaining glutaraldehyde, thereby assuring that the capsules will separate during sieving. The process yields capsules in the range of 20-100 μm and often incorporates over 50 percent of the starting materials into useable capsules. The capsules produced are then separated by size by sieving or other size exclusion sorting. Capsules beyond about 120 μm are difficult to work with because the capsules tend to break during processing from shear force. Additionally, capsules larger than 100 μm are visible to the naked eye, so their presence is seen as ripples in the variable transmission film.

After size sorting, the capsules are mixed with a binder to create a slurry for coating, e.g., using slot coating, knife coating, spin coating, etc. In the embodiments of the invention, the binder comprises a gelatin, typically fish gelatin. In preferred embodiments, the gelatin is combined with acacia, however it has been found that the mixture should not be coacervated because the coacervated mixture will not create a suitably uniform slurry. Additionally, it has been discovered that the haze of a transmissive medium can be improved by varying the amount of acacia that is added to the binder mixture.

To improve off-axis transparency, it may be advantageous to keep the electrophoretic layer as thin as possible, thus reducing the size of any particle structures extending through the thickness of the electrophoretic layer; however, as noted above, a thin electrophoretic layer requires a corresponding increase in the volume fraction of electrophoretic particles to achieve adequate opacity in the closed state of the display. Accordingly, there is likely to be an optimum thickness of the electrophoretic layer for any given selection of materials for use in a light modulator. Off-axis transparency can also be improved by controlling the particle structures so that they do not occupy the whole sidewalls of a droplet. In particular, it is advantageous to concentrate the particles so that the particle structures occupy only part of the sidewalls adjacent one major surface of the layer of electrophoretic medium. Such particle structures may be produced in accordance with the DC/AC drive method of the present invention by first bringing all the particles within a droplet adjacent one major surface of the electrophoretic layer by applying a DC field to the layer, and then driving the particles to the sidewalls using an AC field of appropriate frequency.

Various waveforms for controlling electrophoretic particles in "shutter mode" have been described, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. "Shutter mode" is shorthand for displays having a first state is substantially opaque and a second state that is substantially light-transmissive.

EXAMPLES

Example 1

A nonaqueous internal phase was prepared by combining OLOA 11000, 1-limonene, Cargille® 5040 immersion fluid, Mogul® L (Cabot Corp.), polystyrene (Sigma-Aldrich 331651), and 2-hexyldecanoic acid (Aldrich). The internal phase mixture was then encapsulated by adding the mixture to an aqueous solution of dried porcine gelatin (Gelita USA, Inc) and acacia (AEP Colloids). After the addition of the internal phase was complete, the mixture was stirred and heated to emulsify the internal phase into droplets having an average diameter of about 40-45 µm. To prevent further droplet break down, water and a dispersion of 10 wt. % Emperor 2000 carbon black (Cabot Corp.) with 5 wt. % Kolliphor P188 (Aldrich 15759) in water was added.

After mixing and pH adjustment, the temperature of the mixture was lowered, and 50 wt. % glutaraldehyde was added with continued vigorous stirring. After this addition, the mixture was gradually warmed and stirred vigorously and then cooled. The resulting capsules were sorted to create a mixture of capsules ranging in size from 15-50 µm with a mean size of approximately 30 µm.

The resulting aqueous capsule slurries were centrifuged and then mixed into three different aqueous fish gelatin-based binders; A) having no acacia, B) a 1:3 mixture of acacia to fish gelatin, and C) a 1:1 mixture of acacia to fish gelatin. The fish gelatin was procured from Norland as HiPure Liquid Gelatin, and the acacia from AEP colloids. Each gelatin binder was mixed at a ratio of 1 part by weight binder to 7 parts by weight of capsules, and a solution of colorant 10 wt. % Emperor 2000 carbon black with 5 wt. % Kolliphor P188 in water with a ratio of 1 part carbon black colorant to 49 parts binder. The resultant mixture was bar coated on to a 125 mm thick indium-tin oxide coated polyester film. The coated film was allowed to dry to produce an electrophoretic medium approximately 25 µm thick containing essentially a single layer of capsules.

The capsule-coated surfaces of the coated films were then overcoated with a urethane acrylate based adhesive. As the adhesive layer was added, a screen-printed sheet of 125 mm thick indium-tin oxide coated polyester film was applied. The resulting assemblies were then cured by exposure to UV light from a CSun UV lamp.

Figure 2A:
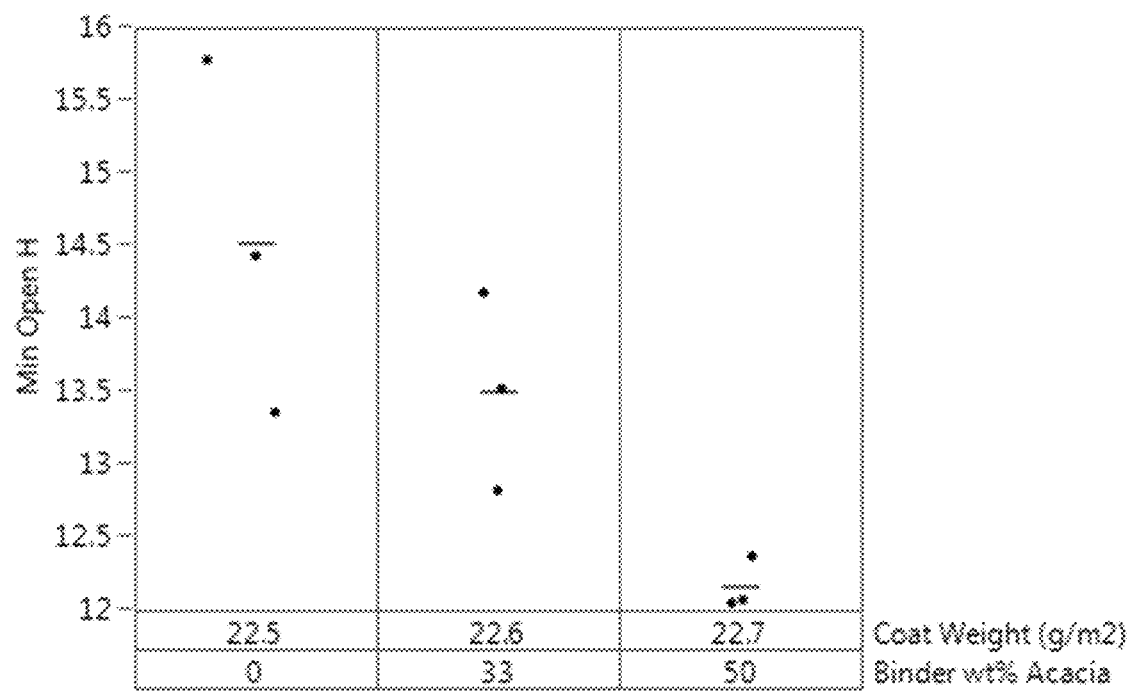
FIG. 2A shows haze measurements for variable transmission samples for a variety of fish gelatin binder compositions. The left panel samples used binder with no acacia, the middle panel samples used binder with 33% (wt./wt.) of acacia; and the right panel samples used binder that was equal parts fish gelatin and acacia.
Figure 2B:
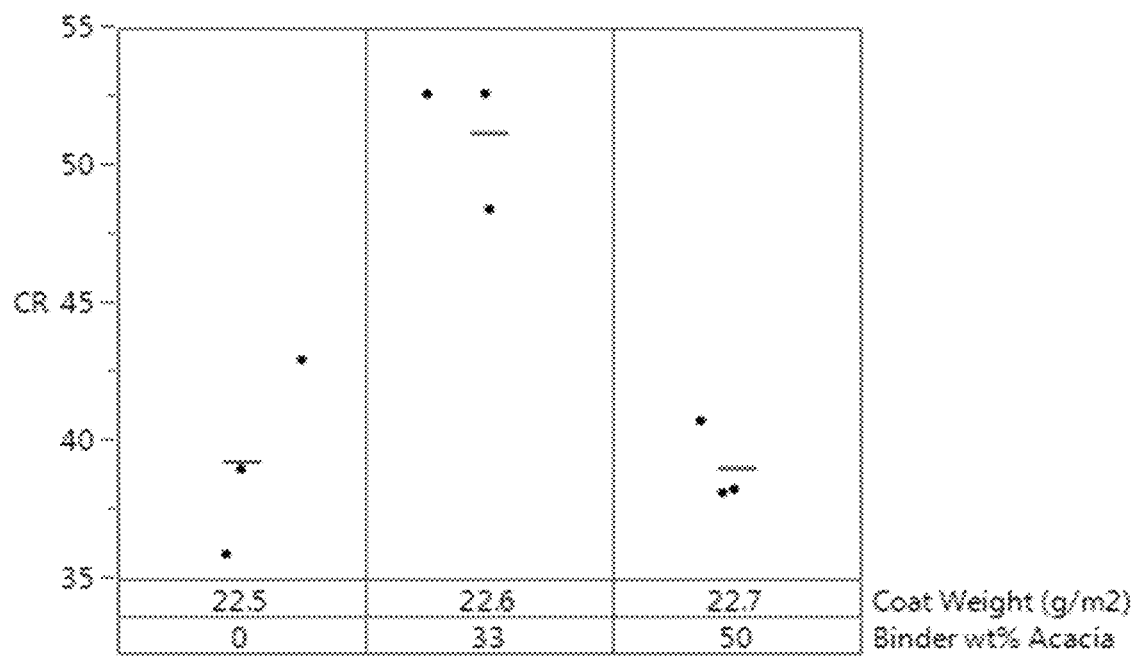
FIG. 2B shows contrast ratio measurements for variable transmission samples for a variety of fish gelatin binder compositions. The left panel samples used binder with no acacia, the middle panel samples used binder with 33% (wt./wt.) of acacia; and the right panel samples used binder that was equal parts fish gelatin and acacia.
Figure 2C:
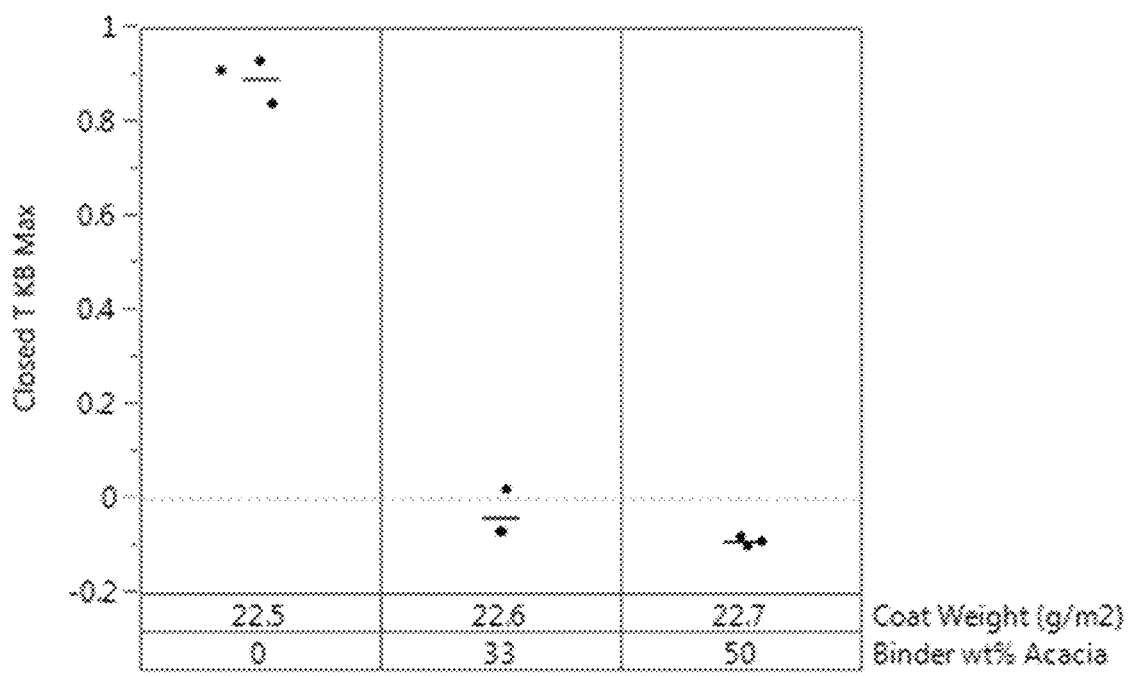
FIG. 2C shows kickback measurements for variable transmission samples for a variety of fish gelatin binder compositions. The left panel samples used binder with no acacia, the middle panel samples used binder with 33% (wt./wt.) of acacia; and the right panel samples used binder that was equal parts fish gelatin and acacia.
Figure 3:
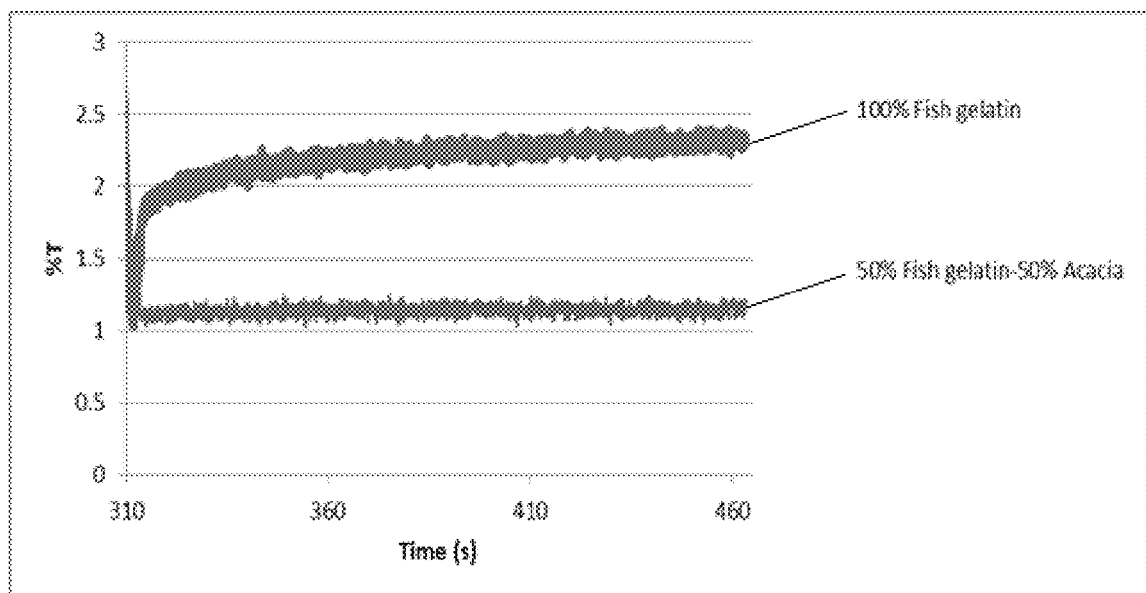
FIG. 3 shows the decay of the closed state for samples having only fish gelatin as a binder compared to samples having equal parts fish gelatin and acacia. In tests, the 1:1 mixture of fish gelatin and acacia had substantially less kickback, resulting in a open and closed states that were stable for weeks.

Several samples of variable transmission test films were prepared for each binder formulation. The samples were then evaluated for open and closed transmission as well as haze using the optical evaluation setup described in U.S. Pat. No. 7,679,814. In brief, each sample was placed in front of a calibrated light source with an integrating detector on the opposite side of the sample. Each sample was driven to the open and closed state and evaluated for transmission. Additionally, a calibrated chopping wheel was used to measure the diffuse versus the transmitted light to evaluate haze. The amount of kickback was also evaluated by comparing the decay in the open state as a function of time (see FIG. 3). The resulting data is shown in FIGS. 2A-2C.

Evaluating the difference between the three binder formulations, it is clear that the 1:1 mixture of fish gelatin and acacia produced an electro-optic medium with good contrast (difference between open and closed states; FIG. 2B) and very low haze (FIG. 2A). Additionally, both binder mixtures containing acacia had little kickback, leading to very long stability in the open and closed state. See FIG. 3.

Example 2

A nonaqueous internal phase was prepared by combining a white pigment dispersion with a first colored pigment dispersion, a second colored pigment dispersion, and a third colored pigment dispersion. This was mixed with a solvent mixture containing Solsperse® and Isopar E and further blended with a solution of poly-isobutylene. The internal phase mixture was then encapsulated by adding the mixture to an aqueous solution of dried porcine gelatin and acacia. After the addition of the internal phase was complete, the mixture was emulsified by mixing, and the pH adjusted while heating. The temperature of the mixture was then lowered, and 50 wt. % glutaraldehyde was added with continued vigorous stirring. After this addition, the mixture was gradually warmed and stirred vigorously and then cooled. The resulting capsules were sorted with sieves to create a mixture of capsules ranging in size from 15-50 µm with a mean size of approximately 40 µm.

The resulting aqueous capsule slurries were then mixed into three different binders; A) a charged poly(vinyl alcohol), B) a 1:1 mixture of acacia to fish gelatin, and C) a standard polyurethane dispersion. The fish gelatin was procured from Norland as HiPure Liquid Gelatin, and the acacia from AEP colloids. Each gelatin binder was mixed at a ratio of 1 part by weight binder to 7 parts by weight of capsules. The resultant mixture was bar coated on to a 125 mm thick indium-tin oxide coated polyester film. The coated film was allowed to dry to produce an electrophoretic medium approximately 21 µm thick containing essentially a single layer of capsules.

The capsule-coated surfaces of the coated films were then laminated with a polyurethane adhesive doped with conductive salts, which was subsequently laminated to a screen-printed backplane assembly approximately 2 inches square. The pixel color states and gamut volume were then measured at multiple temperatures, and the resultant color gamut was taken to encompass the maximum state volume possible for the experimental system with no driving condition limitations beyond maximum voltage. Of the three samples, the film containing the fish gelatin/acacia binder exhibited the greatest and most consistent gamut volume across the temperature range. The results are provided below in Table 1.

TABLE 1

| BINDER | GAMUT VOLUME @ | | |
|---|---|---|---|
| | 0 C. | 25 C. | 50 C. |
| PVOH | 94898 | 110148 | 74652 |
| Polyurethane | 44534 | 48805 | 42485 |
| 1:1 fish gelatin/acacia | 98682 | 97940 | 84766 |

From the foregoing, it will be seen that the present invention can provide an electro-optic medium that lends itself to variable transmission devices having a high contrast between open and closed states with very low haze; attractive qualities for commercial applications such as variable transmission windows.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

We claim:

1. An electro-optic medium comprising a plurality of capsules and a binder, each capsule comprising gelatin and acacia and containing an internal phase including a plurality of electrically charged particles and limonene, the internal phase having an index of refraction between 1.51 and 1.57 at 550 nm, the charged particles being movable by application of an electric field, and the binder comprising fish gelatin and acacia, wherein the binder has a mass ratio of fish gelatin to acacia of 0.5 to 2.0, and wherein the binder has an index of refraction between 1.47 and 1.57 at 550 nm at 50% relative humidity (RH).

2. The electro-optic medium of claim 1, wherein application of the electric field switches the charged particles between an open state and a closed state, wherein absorbance of light of the capsules is greater in the closed state than the open state.

3. The electro-optic medium of claim 1, wherein the electrically charged particles comprise a first type of particles having a first color and a second type of particles having a second color, wherein the first color and second color differ, and the first type of particles have an opposite charge than the second type of particles.

4. The electro-optic medium of claim 1, wherein the electrically charged particles comprise at least three sets of particles, each set of particles having a color that differs from the color of the other two sets of particles, wherein the color of each set of particles is selected from the group consisting of white, black, red, green, blue, magenta, cyan, and yellow.

5. The electro-optic medium of claim 1, wherein the medium exhibits more than 1% and less than 1.5% transmittance decay within 460 seconds of driving to the open state.

* * * * *